Figure 1:
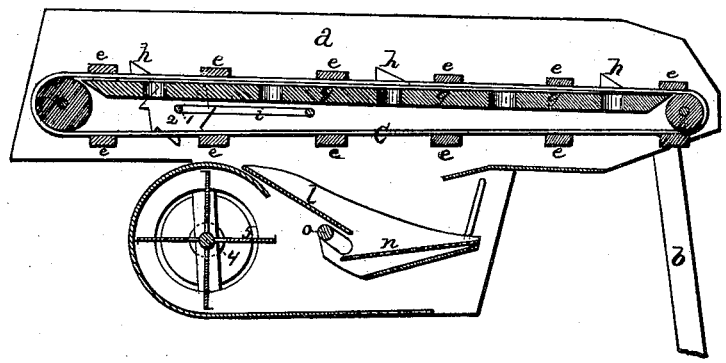
Figure 2:
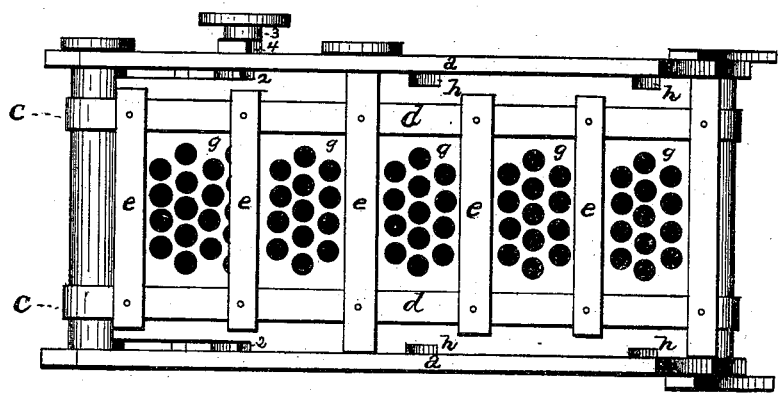

J. SHILLING.
GRAIN-SEPARATOR.

No. 191,377. Patented May 29, 1877.

WITNESSES
J. Wm Garner
Albert J. de Pay

INVENTOR
Jacob Shilling
Per F. A. Lehmann
Atty.

UNITED STATES PATENT OFFICE.

JACOB SHILLING, OF CEDAR SPRING, PENNSYLVANIA.

IMPROVEMENT IN GRAIN-SEPARATORS.

Specification forming part of Letters Patent No. 191,377, dated May 29, 1877; application filed April 23, 1877.

*To all whom it may concern:*

Be it known that I, JACOB SHILLING, of Cedar Spring, in the county of Clinton and State of Pennsylvania, have invented certain new and useful Improvements in Grain-Separator for Thrashing-Machine; and I do hereby declare the following to be a full, clear, and exact description of the invention, such as will enable others skilled in the art to which it pertains to make and use it, reference being had to the accompanying drawings, which form part of this specification.

My invention relates to an improvement in grain-separators; and it consists in the arrangement and combination of parts that will be more fully described hereinafter, whereby a separator is produced that can be attached to any common thrashing-machine, and which will clean the grain well and thoroughly.

The accompanying drawings represent my invention.

$a$ represents the frame, of any suitable construction or shape, which is fastened at one end to the thrashing-machine, and supported at the other by the legs $b$. Running through the top of the frame is the endless straw-carrier $c$, which consists of the two belts $d$ and slats $e$, which slats are of two lengths. The top board or floor $g$ in the frame has a large number of holes made through it, so that the grain which is separated from the straw will at once fall through. On the outer edges of this floor, just opposite each other, are secured a number of triangular pieces, $h$, up which the longer ones of the slats $e$ run, and then drop abruptly down at their rear ends, so as to shake and jar the carrier, and thus shake the grain loose from the straw. By this arrangement of parts the straw and grain are separated from each other, and the straw is carried off the rear end of the frame, while the grain is left behind.

Just under the floor, at the end of the frame which is fastened to the thrashing-machine, is arranged an endless cloth belt, $i$, which catches all the grain that falls through the floor $g$ just above it, and moves it forward toward the fan. Upon each end of the roller 1, which moves the belt $i$ forward, is placed a ratchet-wheel, 2, the teeth of which are so arranged that the longer ones of the slats $e$ catch against them and cause the belt to move intermittently forward.

Under the end of the frame that is farthest away from the thrashing-machine are fastened the sheet-metal plates $l$, which catch all the grain that falls through the floor above them and conduct it toward the fan.

In the lower part of the frame is hung a riddle, $n$, of any desired construction, which is shaken back and forth by means of the crank-shaft $o$, which shaft is driven by a belt from the small pulley 3, arranged on the fan-shaft 4.

As the grain falls from the endless belt and the plates $l$ down toward the riddle it is struck by a blast of air from the fan 5, which is run by a belt from the cylinder-shaft of the thrasher. As the grain falls from one sieve to the other of the riddle the air blows away the chaff, and the grain runs through into a measure or other receptacle placed there to receive it.

Having thus described my invention, I claim—

1. The straw-carrier belt, provided with slats of unequal lengths, in combination with the blocks $h$, the shorter slats being made to pass in between the blocks, and the longer ones to pass over them, so as to shake the grain loose from the straw, substantially as described.

2. The endless apron $i$, arranged under the perforated floor, in combination with the ratchet-wheels 2, and the slats $e$ of the carrier, whereby the apron is moved intermittently forward, substantially as specified.

In testimony that I claim the foregoing I have hereunto set my hand and seal this 10th day of April, 1877.

JACOB SHILLING. [L. S.]

Witnesses:
ANDREW J. WALIZER,
WILLIAM L. MCKIBBEN.